United States Patent [19]

Shotey et al.

[11] Patent Number: 5,763,831

[45] Date of Patent: Jun. 9, 1998

[54] UNIVERSAL COVER PLATE, COVER PLATE ASSEMBLY, AND RELATED METHODS

[75] Inventors: Michael Shotey, Scottsdale; Edgar W. Maltby, Mesa; Mike McConnaughy, Glendale, all of Ariz.

[73] Assignee: TayMac Corporation, Tempe, Ariz.

[21] Appl. No.: 450,559

[22] Filed: May 25, 1995

[51] Int. Cl.⁶ ................................................. H02G 3/14
[52] U.S. Cl. ................................... 174/67; 220/242
[58] Field of Search ........................... 312/328, 329; 220/241, 242, 3.8; 174/66, 67; 16/268

[56] References Cited

U.S. PATENT DOCUMENTS

| | | | |
|---|---|---|---|
| 932,601 | 8/1909 | Corbett | 16/268 |
| 3,432,611 | 3/1969 | Gaines | 174/66 |
| 3,437,738 | 4/1969 | Wagner | 174/55 |
| 3,438,534 | 4/1969 | Zerwes | 220/241 |
| 3,530,230 | 9/1970 | Cormier | 174/66 |
| 3,544,703 | 12/1970 | Jones | 174/66 |
| 3,895,179 | 7/1975 | Wyatt | 220/3.94 |
| 4,032,030 | 6/1977 | Bass | 220/241 |
| 4,500,746 | 2/1985 | Meehan | 174/48 |
| 4,833,277 | 5/1989 | Jacoby | 174/66 |
| 5,362,924 | 11/1994 | Correnti | 174/67 |

FOREIGN PATENT DOCUMENTS 326377  3/1930  United Kingdom ............... 403/403

*Primary Examiner*—Bot L. Ledynh
*Assistant Examiner*—Dhiru R. Patel
*Attorney, Agent, or Firm*—Stephen T. Sullivan

[57] ABSTRACT

A method and apparatus for converting a universal cover plate for an electrical outlet to any desired specific cover plate. The apparatus includes a base having removable tabs and hinges. To create the desired cover plate, the appropriate tabs are removed to leave apertures that accommodate the desired standard electrical outlet such as a light switch or socket. An optional cover may have removable hinges that allow the cover to open along more than one axis. To make a base that fits with a lid hinged on its longer side, hinges on the shorter side are removed, by prying, sawing, or cutting. Alternatively, to make a base that fits a lid hinged on the shorter side of the base, hinges on the longer side are removed. If a base with no cover is desired, all the hinges may be removed.

20 Claims, 3 Drawing Sheets

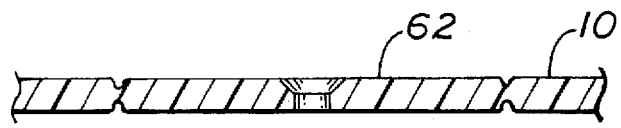
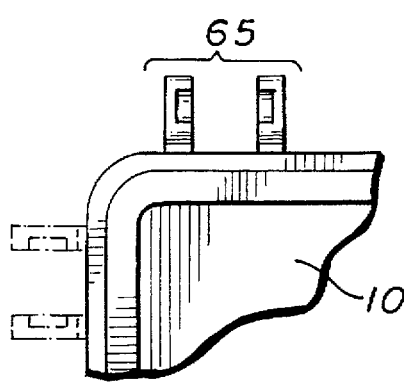
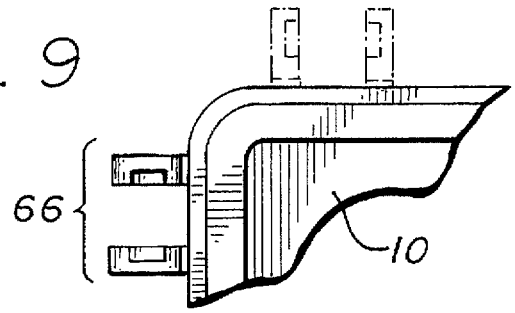
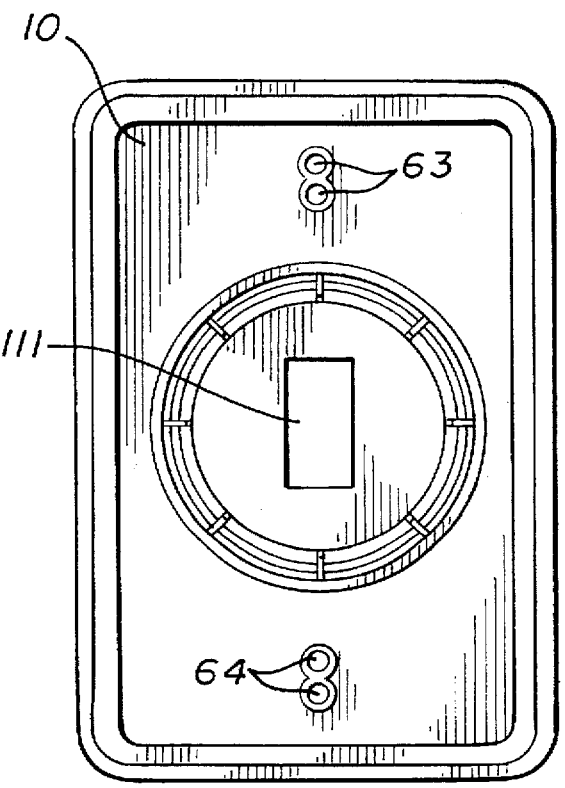
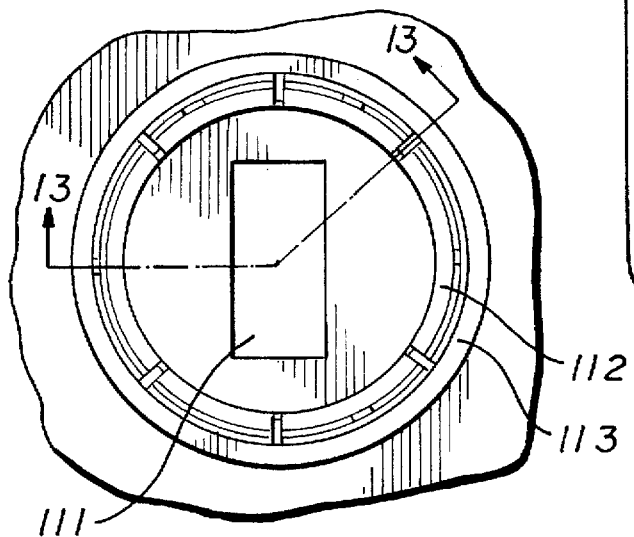

UNIVERSAL COVER PLATE, COVER PLATE ASSEMBLY, AND RELATED METHODS

BACKGROUND

This invention relates generally to a cover plate for electrical outlets, and more particularly to a universal cover plate that can be converted into a desired specific cover plate by detaching removable tabs.

Cover plates enclose outlets behind a wall, thereby preventing inadvertent access to the electrically conductive elements of the outlets and hiding the unattractive wiring. The electrical devices attached at the outlet vary, and consequently cover plates of many varieties are known. For example, electric sockets, both standard and ground fault current interrupts; light switches, both toggle and rocker plates; and cable television or telephone ports may be wired at a given outlet. The outlets may be used for indoor or outdoor weatherproof wiring, or may require a locked cover.

Each type of outlet has a different type of cover plate configured for it. To install or service the outlets, an electrician must carry several types of cover plates to each site, necessitating the ordering and inventorying of many types of cover plates. This is time-consuming, expensive and inefficient. It is desirable, therefore, to have a universal cover plate to accommodate most commonly-encountered outlets.

To this end, a partial solution to the problem is known in the art comprising a three-piece cover plate with interchangeable parts. The base of this device has two pieces, a frame having a rectangular aperture and an insert that fills the aperture. Several versions of inserts are available, depending on the type of device to be wired. For example, one insert accommodates a duplex electrical socket, a separate insert accommodates a ground fault current interrupt. The base is hinged at one end to receive a mated lid, thereby creating a hinged enclosure. The desired insert is chosen, inserted into the aperture of the frame, the lid attached, and the cover plate attached to the wall. To use this device for various types of outlets multiple parts must be carried by the electrician, including multiple inserts, bases, and lids. The prior art therefore does not solve the problem of having to order, stock and carry many different parts. Furthermore, the variety of cover plates is limited to the number of inserts, and only a single-axis hinged lid is known, and the base-lid pair does not allow for base without a lid.

The object of this invention is to provide a universal cover plate that can be used for a large variety of outlets, with a cover or without. A further object of this invention is to reduce the number of parts necessary to be ordered, stocked, and carried in order to service all types of outlets. A further object of this invention is to provide a cover plate having a lid that may be hinged on more than one axis. These objectives are achieved with the several embodiments described below and in the accompanying claims and drawings. Variations and modifications which are in the spirit of this invention and known to those skilled in the art are considered to fall within the scope of this patent.

SUMMARY OF THE INVENTION

The present invention is a method and apparatus for converting a universal cover plate for an electrical outlet to any desired specific cover plate. The apparatus includes a base having removable tabs and hinges. To create the desired cover plate, the appropriate tabs are removed to leave apertures that accommodate the desired standard electrical outlet such as a light switch or socket. An optional cover may have removable hinges that allow the cover to open along more than one axis. To make a base that fits with a lid hinged on its longer side, hinges on the shorter side are removed, by prying, sawing, or cutting. Alternatively, to make a base that fits a lid hinged on the shorter side of the base, hinges on the longer side are removed. If a base with no cover is desired, all the hinges may be removed.

BRIEF DESCRIPTION OF THE DRAWINGS

FIG. 7 is a cross sectional view along line 7—7 of FIG. 6 showing a structural design for easy removal of the tab.

FIGS. 9 and 10 illustrate removable hinges on the base.

FIG. 11 is a top view of another embodiment of a universal electrical socket base according to one invention after hinges have been removed, but before removable tabs have been removed.

FIG. 12 is a close-up view of the removable tabs of FIG. 11.

DESCRIPTION OF THE SEVERAL EMBODIMENTS

Figure 8:
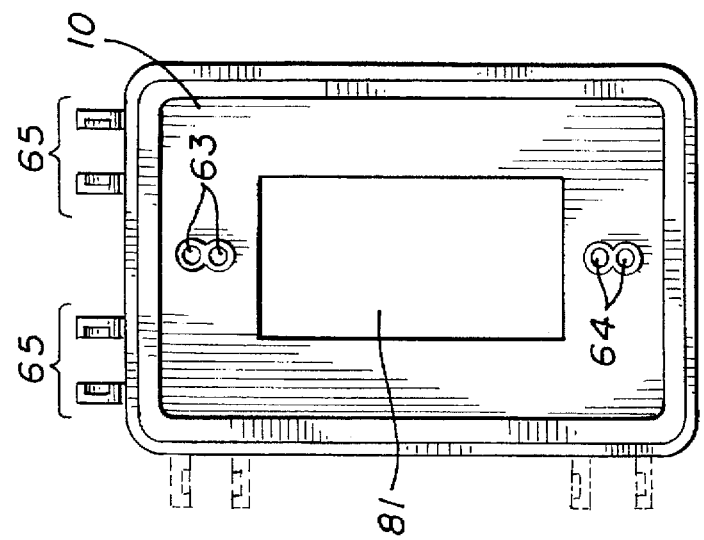
FIG. 8 is a top view of the present invention illustrating a ground fault current interrupt electrical socket base according to another embodiment of the invention after removable tabs and hinges have been removed.
Figure 6:
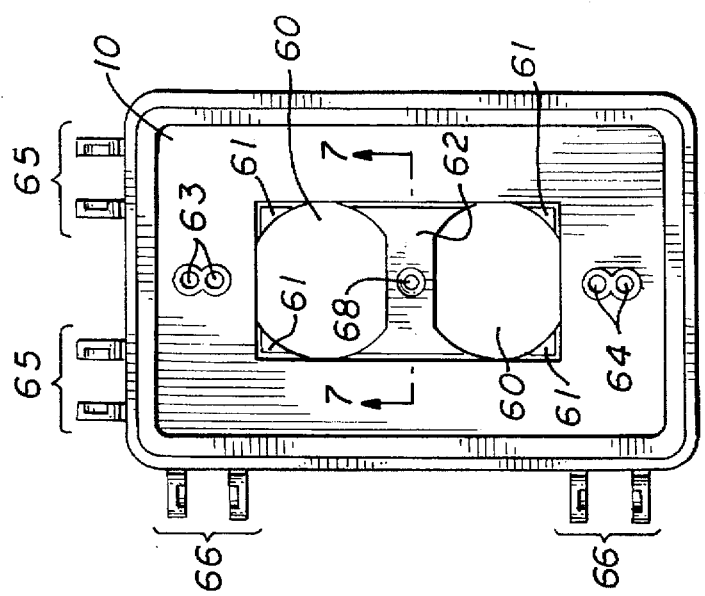
FIG. 6 is a top view of a universal electrical socket base according to the first embodiment of the invention before removable tabs and hinges have been removed.

Refer now to FIGS. 1–13 in which several embodiments of the invention are shown and where like numbers refer to like parts throughout the drawings. A common element among the embodiments is a base 10. In this invention, the base contains removable tabs that are detached to convert the universal base to a specific cover plate that accommodates a desired type of outlet. For clarity, simple combinations of removable tabs are shown, however in practice a single base may have as many removable tabs as desired, within only manufacturing limitations. For example, FIG. 6 shows a base configured with apertures 60 for a duplex electrical socket, with detachable tabs 61 and 62. Tab 62 in this embodiment includes a hole 68 for a mounting screw. If desired, the tabs 61 and 62 may be removed, leaving a rectangular aperture 81 to accommodate a ground fault current interrupt circuit. See. FIG. 8. Tabs 61 are triangularly shaped pieces, and tab 62 is a bow-tie-shaped piece.

The base also has removable portions at 63 and 64 to accommodate mounting screws. All four holes may be opened by knocking out the tabs, or a fewer number selected. Alternatively, the holes may be conventional through-holes. Detachable hinges 65 and 66 are mounted on the base. To make a base that fits with a lid hinged on the longer side of the base, hinges 65 are removed, by prying, sawing, or cutting, leaving hinges 66. See FIG. 9. Alternatively, to make a base that fits a lid hinged on the shorter side of the base, hinges 66 are removed, leaving hinges 65. See FIGS. 8 and 10. If a base with no cover is desired all the hinges may be removed, as illustrated in FIG. 11.

Figure 1:
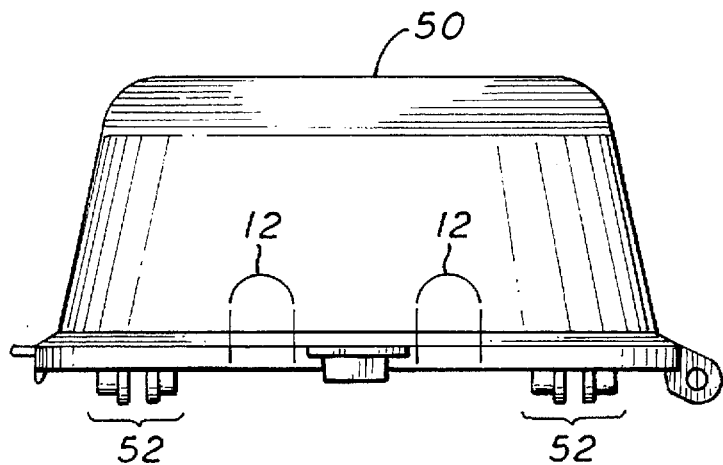
FIG. 1 is a side view of a first embodiment of the present invention, illustrating two sets of removable hinges and removable cord outlets.
Figure 2:
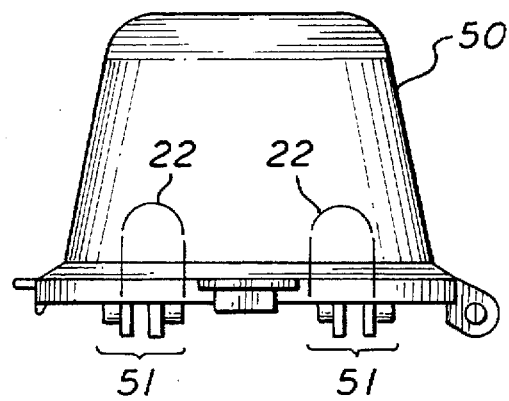
FIG. 2 is an end view of one embodiment of FIG. 1, illustrating two sets of removable hinges and removable cord outlets.
Figure 3:
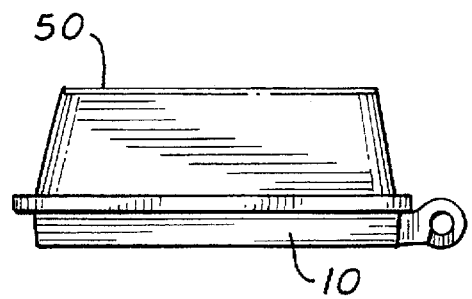
FIG. 3 is an end view of an assembled base and lid of a second embodiment of the present invention showing the device after one set of removable hinges had been removed.
Figure 4:
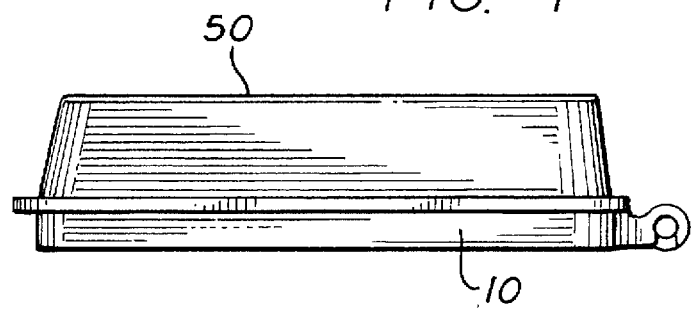
FIG. 4 is a side view of an assembled base and lid of a second embodiment of the present invention showing the device after a different set of removable hinges has been removed.
Figure 5:
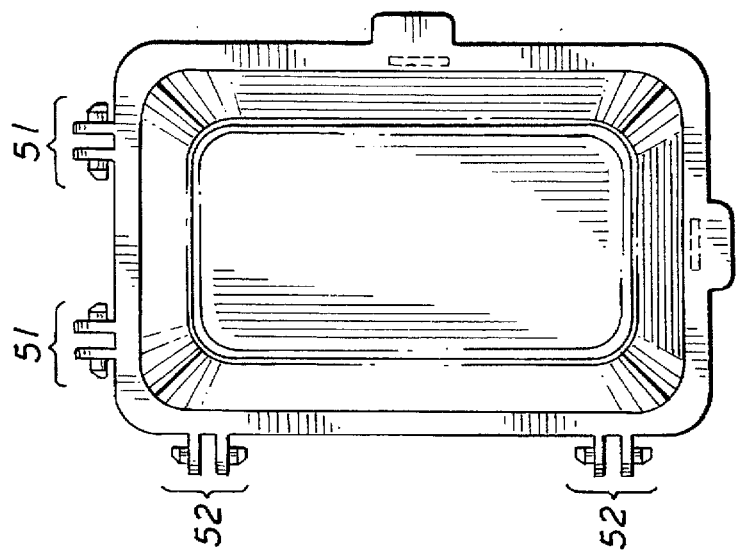
FIG. 5 is a top view of the first embodiment of the present invention illustrating two sets of removable hinges.

An enclosed cover plate may be created by attaching a lid 50 to the base 10 with hinges. Accordingly, the lid 50 has mated hinge pairs 51 and 52, as shown in FIG. 5. The desired pair is removed to create a box hinged on the longer or shorter side. The lid is then attached to the base hinges. To allow cords to exit the enclosure, removable tabs 12 and 22 may be formed in the lid as shown in FIG. 1 and FIG. 2, respectively. The tabs may be removed, as desired, to accommodate the cord. FIG. 3 and 4 show an end view and a side view, respectively, of a second embodiment of the present. In these figures, the lid has been assembled with the base, and only a single set of hinges remains.

FIG. 11 shows a base with no hinges. The base has an aperture 111 to accommodate a toggle light switch. Single-round outlets of various diameters can be accommodated by removing detachable pieces 112 and 113. FIG. 12 shows an enlarged view of the single-round and light switch combination. To accommodate a rocker-type light switch, the base can be designed with detachable tabs that accommodate the rocker panel (not shown). Similarly, removable tabs can be formed in the universal base to accommodate a modular phone jack, cable television outlet or other aperture to accommodate a specific device.

Figure 13:
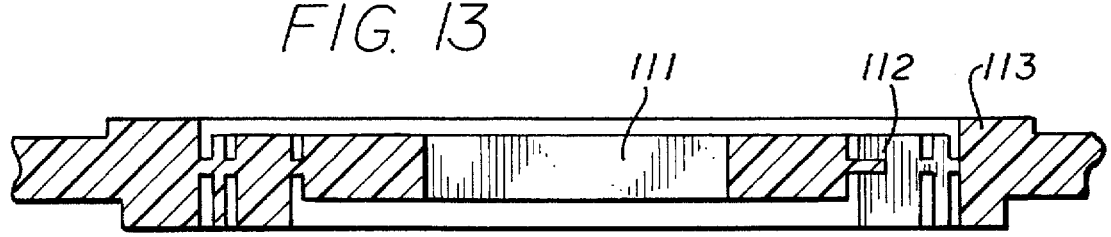
FIG. 13 is a cross section view along line 13—13 of FIG. 12 showing a structural design for easy removal of the tabs.

The detachable tabs may be formed in the device by several methods, with an overriding concern to satisfy electrical codes by ensuring electrically live areas within the outlet are protected. For cover plates made with molded materials, such as plastic, the thickness of the material is thinned at the perimeter of the tab. The thinned portion is relatively easily broken, and the tab can easily be detached. FIGS. 7 and 13 illustrate a thinned portion of the base. An alternate method is to score the device where removable parts are desired. The tabs may also be formed by perforating the perimeter of the removable portion. A balance must be achieved between easy detachment for tabs that are to be removed and sufficient strength in the remaining cover plate if they are left in.

We claim:

1. An electrical cover plate comprising:
 a base comprising a planar member, the planar member including a first aperture, and
 at least one removable tab integral with the planar member and forming part of the first aperture so that the first aperture passes through the base when the at least one removable tab is intact, where the at least one removal tab is positioned at the first aperture so that removal of the at least one removable tab convert the first aperture to a second aperture so that the second aperture is substantially rectangular.

2. An electrical cover plate according to claim 1, wherein:
 the first aperture with the at least one tab intact is shaped and positioned for receiving an electrical socket; and
 the at least one tab is positioned at the first aperture so that removal of the at least one tab converts the first aperture to the second aperture so that the second aperture is shaped and positioned for receiving a ground-fault circuit interrupt socket.

3. An electrical cover plate according to claim 1, wherein the first aperture is shaped and positioned to receive an electrical socket.

4. An electrical cover plate according to claim 1, wherein the at least one removable tab includes a mounting screw hole, the mounting screw hole being substantially circular to receive a mounting screw.

5. An electrical cover plate according to claim 1, wherein the at least one tab when intact in the planar member forms a third substantially circular aperture to receive an electrical socket.

6. An electrical cover plate according to claim 1, wherein the base is substantially rectangular.

7. An electrical cover plate according to claim 1, wherein the at least one removable tab comprises a plurality of substantially concentric annular rings.

8. An electrical cover plate assembly comprising:
 a base comprising a planar member and four sides, the planar member including a first aperture, the base further including at least one removable tab integral with the planar member to form part of the first aperture so that the first aperture passes through the base when the at least one removable tab is intact, a first one of the sides of the base being substantially nonparallel to a second one of the sides of the base,
 the base further including at least one removable hinge member integral with the first side of the base and at least one removable hinge member integral with the second side of the base; and
 a cover for mating with the base, having first and second sides corresponding respectively to the first and second sides of the base, at least one removable hinge member integral with the first side of the cover and mated to cooperate with the at least one removable hinge member of the first aide of the base, and at least one removable hinge fiber integral with the second side of the cover and mated to cooperate with the at least one removable hinge member of the second side of the base.

9. An electrical cover plate bases by according to claim 8, further comprising at least one removable cover tab integral with the cover.

10. An electrical cover plate assembly according to claim 9, wherein the at least one removable cover tab comprises a flat surface.

11. An electrical cover plate assembly according to claim 8, wherein the first and second base sides are substantially orthogonal with respect to one another, and the first and second cover sides are substantially orthogonal with respect to one another.

12. An electrical cover plate assembly according to claim 8, wherein the cover includes at least one removable cover tab, which creates a cover aperture through the cover upon removal of the at least one removable cover tab for passage of an electrical conductor.

13. A cover plate for an electrical device outlet comprising:
 a base including a planar member, the planar member including first and third apertures each shaped and sized to receive an electrical socket, the planar member further including a center removable tab disposed between the first and third apertures, each of the first and third apertures having two corners spaced from the center removable tab, and the planar member further including four removable corner tabs, one of the corner tabs being disposed in each of the four corners of the first and second third apertures, whereupon removal of the center tab and the corner tabs creates a second substantially rectangular aperture.

14. A cover plate assembly comprising:

a base having a first side and a second side substantially nonparallel to the first bags side, the base including at least one detachable hinge member on the first base side, and at least one detachable hinge member on the second base side;

a cover having first and second sides corresponding respectively to the first and second base sides, the second cover side being substantially nonparallel to the first base side, the cover including at least one detachable hinge member on the first cover side that mates to the at least one hinge member on the first base side and at least one detachable hinge member on a second cover side that mates to the at least one hinge member on the second base side.

15. An electrical cover plate assembly according to claim 14, wherein the first and second base sides are substantially orthogonal with respect to one another, and the first and second cover sides are substantially orthogonal with respect to one another.

16. An electrical cover plate assembly according to claim 14, wherein the cover includes at least one removal cover tab such that removal of the at least one removable cover tab creates a corresponding at least one aperture through the cover.

17. A method for converting an electrical cover plate assembly, the method comprising the steps of:

a) removing one of a first and second removable hinge assembly from a base of the cover plate assembly, the first base hinge assembly comprising at least one removable hinge member integral with a first side of the base, and the second base hinge assembly comprising at least one removable hinge member integral with a second side of the base nonparallel with the first base side;

b) removing one of a first and second hinge assembly from a cover of the cover plate assembly, the one of the first and second cover hinge assemblies corresponding to the one of the first and second base hinge assemblies, the first cover hinge assembly comprising at least one removable hinge Member integral with a first side of the cover, and the second cover hinge assembly comprising at least one removable hinge member integral with a second side of the cover nonparallel with the first cover side; and c) attaching the base to the cover at the ones of the first and second base and cover hinge assemblies.

18. A method according to claim 17, wherein the first and second base sides are substantially orthogonal with respect to one another, and the first and second cover sides are substantially orthogonal with respect to one another.

19. An electrical cover plate comprising:

a base comprising a planar member;

a first substantially circular removable tab integral with the planar member and including a substantially rectangular aperture;

a second substantially ring shaped removable tab integral with the planar member, the second tab being disposed around at least a portion of the first tab.

20. An electrical cover plate-according to claim 19, wherein the substantial rectangular aperture of the first tab is shaped and positioned to receive a light switch.

* * * * *

UNITED STATES PATENT AND TRADEMARK OFFICE
CERTIFICATE OF CORRECTION

PATENT NO. : 5,763,831
DATED : June 9, 1998
INVENTOR(S) : Shotey, et al.

It is certified that error appears in the above-indentified patent and that said Letters Patent is hereby corrected as shown below:

In claim 1, column 3, line 55 of the Patent, change "where' to --wherein--.

In claim 1, column 3, line 55 of the Patent, change "removal" to --removable--.

In claim 1, column 3, line 57 of the Patent, change "convert" to --converts--.

In claim 8, column 4, line 35 of the Patent, change "aide" to --side--.

In claim 8, column 4, line 36 of the Patent, change "fiber" to --member--.

In claim 9, column 4, line 40 of the Patent, change "bases by" to --assembly--.

In claim 13, column 4, line 67 of the Patent, delete "second".

In claim 14, column 5, line 5 of the Patent, change "bags" to --base--.

In claim 16, column 5, line 24 of the Patent, change "removal" to --removable--.

In claim 17, column 6, line 10 of the Patent, change "Member" to --member--.

Signed and Sealed this

Tenth Day of April, 2001

*Attest:*

NICHOLAS P. GODICI

*Attesting Officer*  Acting Director of the United States Patent and Trademark Office

(12) EX PARTE REEXAMINATION CERTIFICATE (5071st)
United States Patent
Shotey et al.

(10) Number: US 5,763,831 C1
(45) Certificate Issued: Mar. 1, 2005

(54) UNIVERSAL COVER PLATE, COVER PLATE ASSEMBLY, AND RELATED METHOD

(75) Inventors: Michael Shotey, Scottsdale, AZ (US);
Edgar W. Maltby, Mesa, AZ (US);
Mike McConnaughy, Glendale, AZ (US)

(73) Assignee: TayMac Corporation, Tempe, AZ (US)

Reexamination Request:
No. 90/006,005, May 11, 2001
No. 90/006,497, Dec. 27, 2002

Reexamination Certificate for:
Patent No.:  5,763,831
Issued:      Jun. 9, 1998
Appl. No.:   08/450,559
Filed:       May 25, 1995

Certificate of Correction issued Apr. 10, 2001.

(51) Int. Cl.$^7$ .................................. H02G 3/14
(52) U.S. Cl. ........................... 174/67; 220/242
(58) Field of Search ............... 174/67, 66, 53, 174/57, 50; 220/3.2, 3.3, 3.8, 241, 242; 312/328; 16/268

(56) References Cited

U.S. PATENT DOCUMENTS

| | | |
|---|---|---|
| 872,694 A | 12/1907 | Thiem |
| 1,608,621 A | 11/1926 | Sachs |
| 1,784,277 A | 12/1930 | Darlington |
| 1,952,719 A | 3/1934 | Lewin .......................... 247/15 |
| 2,240,187 A | 4/1941 | Kingdon et al. ............... 220/27 |
| 3,564,112 A | 2/1971 | Algotsson et al. ............ 174/52 |
| 3,654,663 A * | 4/1972 | Algotsson ..................... 16/230 |
| 3,690,035 A | 9/1972 | Schindlauer ................. 49/192 |
| 5,076,641 A | 12/1991 | Lindberg ..................... 297/194 |
| 5,556,289 A * | 9/1996 | Holbrook, Jr. .............. 439/135 |

OTHER PUBLICATIONS

Carlton In–Use Weatherproof Covers, Carlton Electrical products. 1994.*

* cited by examiner

Primary Examiner—Dean A. Reichard

(57) ABSTRACT

A method and apparatus for converting a universal cover plate for an electrical outlet to any desired specific cover plate. The apparatus includes a base having removable tabs and hinges. To create the desired cover plate, the appropriate tabs are removed to leave apertures that accommodate the desired standard electrical outlet such as a light switch or socket. An optional cover may have removable hinges that allow the cover to open along more than one axis. To make a base that fits with a lid hinged on its longer side, hinges on the shorter side are removed, by prying, sawing, or cutting. Alternatively, to make a base that fits a lid hinged on the shorter side of the base, hinges on the longer side are removed. If a base with no cover is desired, all the hinges may be removed.

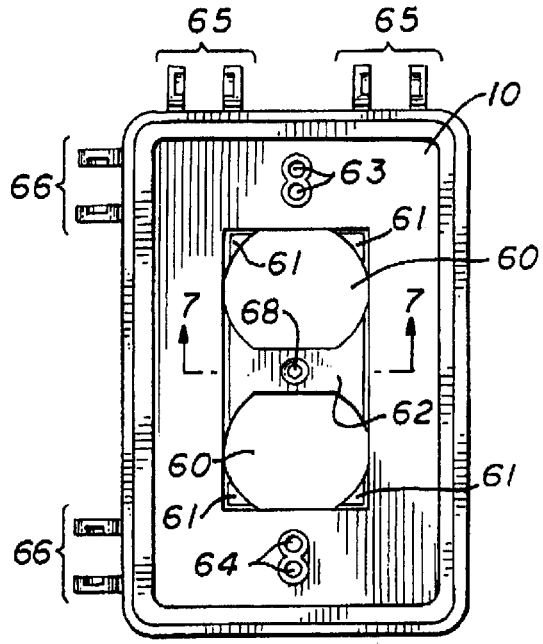

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14–20 is confirmed.

Claims 2 and 3 are cancelled.

Claims 1, 8 and 13 are determined to be patentable as amended.

Claims 4–7 and 9–12, dependent on an amended claim, are determined to be patentable.

New claims 21–43 are added and determined to be patentable.

1. An electrical cover plate comprising:
    a base comprising a planar member, the planar member including a first aperture[,] *sized and shaped to receive a standard electrical outlet;* and
    at least one removable tab integral with the planar member and forming part of the first aperture so that the first aperture passes through the base when the at least one removable tab is intact, wherein the at least one removable tab is positioned at the first aperture so that removal of the at least one removable tab converts the first aperture to a second aperture so that the second aperture is substantially rectangular *and sized and shaped to receive an outlet face of a ground fault current interrupt socket such that only the socket face is exposed.*

8. An electrical cover plate assembly comprising:
    a base comprising a planar member and four sides, the planar member including a first aperture, the base further including at least one removable tab integral with the planar member to form part of the first aperture so that the first aperture passes through the base when the at least one removable tab is intact, a first one of the sides of the base being substantially nonparallel to a second one of the sides of the base, the base further including at least one [removable] hinge member integral with the first side of the base and at least one [removable] hinge member integral with the second side of the base; and
    a cover for mating with the base, having first and second *cover* sides corresponding respectively to the first and second sides of the base, at least one [removable] hinge member integral with the first side of the cover and mated to cooperate with the at least one [removable] hinge member of the first side of the base, and at least one [removable] hinge member integral with the second side of the cover and mated to cooperate with the at least one [removable] hinge member of the second side of the base;
    wherein each hinge member is detachable from the corresponding respective cover and base hinge member with which it cooperates such that the cover and base are detachable from each other, and each hinge member is permanently removable from the respective cover and base side with which it is integral.

13. A cover plate for an electrical device outlet comprising:
    a base including a planar member, the planar member including first and third apertures each shaped and sized to receive an electrical socket *of a duplex electrical outlet*, the planar member further including a center removable tab disposed between the first and third apertures, each of the first and third apertures having two corners spaced from the center removable tab, and the planar member further including four removable corner tabs, one of the corner tabs being disposed in each of the four corners of the first and third apertures, whereupon removal of the center tab and the corner tabs creates a second substantially rectangular aperture *sized and shaped to receive an outlet face of a ground fault current interrupt outlet such that only the outlet face is exposed.*

21. *An electrical cover plate adaptable for use with either a toggle switch or a round outlet, the cover plate comprising:*
    *a base comprising a planar member, wherein the base further comprises at least a first substantially circular removable tab integral with the planar member and a second substantially ring shaped removable tab integral with the planar member and disposed around at least a portion of the first substantially circular removable tab;*
    *wherein the planar member is configured to be adapted for use with a toggle switch without removing the first substantially circular removable tab, and for use with a round outlet by removing at least the first substantially circular removable tab.*

22. *An electrical cover plate adaptable for use with either a toggle switch or a round outlet, the cover plate comprising:*
    *a base comprising a planar member having a substantially rectangular aperture, at least one substantially circular removable tab integral with the planar member and surrounding the substantially rectangular aperture, and a second substantially ring shaped removable tab integral with the planar member and disposed around at least a portion of the first substantially circular removable tab;*
    *wherein the planar member is configured to receive a toggle switch through the substantially rectangular aperture, is alternatively configured to receive a first round outlet having a first diameter by removing at least the first substantially circular removable tab, and is alternatively configured to receive a second round outlet having a second diameter by removing the second substantially ring shaped removable tab.*

23. *An electrical cover plate adaptable for use with either a toggle switch or a round outlet, the cover plate comprising:*
    *a base comprising a planar member having a plurality of removable tabs disposed concentrically about one another, wherein the planar member is adaptable to include an aperture sized and shaped to alternatively receive a toggle switch, a first round outlet having a first diameter and a second round outlet having a* second diameter depending upon which removable tab is removed, and wherein by selective removal of the at least one tab, the planar member comprises the aperture sized and shaped to receive one of the toggle switch, the first round outlet and the second round outlet.

24. A method for converting an electrical cover plate assembly, the method comprising the steps of:
  a) detaching a first detachable cover hinge assembly from a first base hinge assembly of the cover plate assembly, the first base hinge assembly comprising at least one detachable hinge member integral with a first side of the base, the first detachable cover hinge assembly comprising a detachable hinge member integral with a first side of the base;
  b) attaching a second detachable cover hinge assembly to a second base hinge assembly of the cover plate assembly, the second base hinge assembly comprising at least one detachable hinge member integral with a second side of the base, the second side of the base being substantially non-parallel with the first side of the base, the second detachable cover hinge assembly comprising a detachable hinge member integral with a second side of the cover substantially nonparallel with the first side of the cover.

25. The method of claim 24, further comprising the steps of:
  c) permanently removing the first detachable cover hinge assembly from the cover; and
  d) closing the cover against the base.

26. A single gang electrical cover plate assembly configured for changing between vertical and horizontal mounted orientations, the assembly comprising:
  a base having a first side having a first length and a second side substantially nonparallel to the first base side and having a second length longer than the first length, the base including at least one detachable hinge member integral with the first base side, and at least one detachable hinge member integral with the second base side; and
  a cover having a first side having a third length and a second side substantially nonparallel to the first cover side and having a fourth length longer than the third length, the cover including at least one detachable hinge member integral with the first cover side and configurable to be hinged along the first sides of the base and cover by attaching the detachable hinge member of the first cover side with the detachable hinge member of the first base side, and configurable to be hinged along the second sides of the base and cover by attaching the detachable hinge member of the second cover side with the detachable hinge member of the second base side.

27. A single gang electrical cover plate assembly according to claim 26, wherein the detachable hinge member integral with the first cover side comprises a removable hinge member which when removed converts the single gang electrical cover plate assembly to a cover plate assembly dedicated to hinge along the respective second sides of the base and cover.

28. A single gang electrical cover plate assembly according to claim 26, wherein the detachable hinge member integral with the second cover side comprises a removable hinge member which when removed converts the single gang electrical cover plate assembly to a cover plate assembly dedicated to hinge along the respective first sides of the base and cover.

29. A single gang electrical cover plate assembly according to claim 26, further comprising at least one removable cover tab integral with the cover on a cover side without a hinge member.

30. A single gang electrical cover plate assembly according to claim 29, wherein the at least one removable cover tab is located on a side parallel to a hinged side.

31. A single gang electrical cover plate assembly according to claim 26, wherein each of the detachable hinge members integral with their respective sides is further permanently removable from their respective sides.

32. A single gang cover plate assembly configured for changing between hinging along a longer side and a shorter side of the assembly, the assembly comprising:
  a base having a first side and a second side substantially nonparallel to the first base side, the base including at least one hinge member on the first base side and at least one hinge member on the second base side, the base further comprising a third side substantially parallel to the first side and a fourth side substantially parallel to the second side, the first and third sides having lengths shorter than longer lengths of the second and fourth side; and
  a cover having first, second, third and fourth sides, the second cover side being substantially nonparallel to the first cover side, and the third and fourth sides being substantially parallel to the first and second sides respectively, the cover including at least one hinge member on the first cover side configured to attach to and detach from the at least one hinge member on the first base side, and at least one hinge member on a second cover side configured to attach to and detach from the at least one hinge member on the second base side;
  wherein the cover plate assembly is configured for alternatively hinging between hinge members on the shorter sides by attaching the at least one first cover side hinge member with the at least one first base side hinge member, and hinge members on the longer sides by attaching the at least one second cover side hinge member with the at least one second base side hinge member.

33. An electrical cover plate assembly according to claim 32, wherein at least one of the hinge member on the first cover side and the hinge member on the first base side comprises a removable hinge member which when removed from the respective cover or base side converts the single gang cover plate assembly to be dedicated to hinging along the longer sides.

34. A single gang cover plate assembly according to claim 32, wherein at least one of the hinge member on the second cover side and the hinge member on the second base side comprises a removable hinge member which when removed from the respective cover or base side converts the single gang cover plate assembly to a dedicated to hinging along the shorter sides.

35. A method for converting a single gang electrical cover plate assembly between an assembly configured for hinging along a short side of the assembly and an assembly configured for hinging along a long side of the assembly, the method comprising the steps of:
  a) detaching a first detachable cover hinge assembly from a first base hinge assembly of the cover plate assembly, the first base hinge assembly comprising at least one detachable hinge member integral with a first side of the base, the first detachable cover hinge assembly comprising a detachable hinge member integral with a first side of the cover;

b) attaching a second detachable cover hinge assembly to a second base hinge assembly of the cover plate assembly, the second base hinge assembly comprising at least one detachable hinge member integral with a second side of the base, the second detachable cover hinge assembly comprising a detachable hinge member integral with a second side of the cover substantially nonparallel with the first side of the cover;

wherein the first base side and first cover side are shorter than the second base side and second cover side respectively.

36. The method of claim 35, further comprising the step of:

c) dedicating the assembly to hinging along the long side by permanently removing at least one of the first base hinge assembly from the base and the first cover hinge assembly from the cover.

37. The method of claim 35, further comprising the steps of:

c) detaching the second detachable cover hinge assembly from the second base hinge assembly of the cover plate assembly; and d) attaching the first detachable cover hinge assembly to the first base hinge assembly of the cover plate assembly.

38. A method for converting a single gang electrical cover plate assembly between an assembly configured for hinging along a long side of the assembly and an assembly configured for hinging along a short side of the assembly, the method comprising the steps of:

a) detaching a first detachable cover hinge assembly from a first base hinge assembly of the cover plate assembly, the first base hinge assembly comprising at least one detachable hinge member integral with a first side of the base, the first detachable cover hinge assembly comprising a detachable hinge member integral with a first side of the cover;

b) attaching a second detachable cover hinge assembly to a second base hinge assembly of the cover plate assembly, the second base hinge assembly comprising at least one detachable hinge member integral with a second side of the base, the second detachable cover hinge assembly comprising a detachable hinge member integral with a second side of the cover substantially nonparallel with the first side of the cover;

wherein the first base side and first cover side are longer than the second base side and second cover side respectively.

39. The method of claim 38, further comprising the step of:

c) dedicating the assembly to hinging along the short side by permanently removing at least one of the second base hinge assembly from the base and the second cover hinge assembly from the cover.

40. The method of claim 38, further comprising the steps of:

c) detaching the first detachable cover hinge assembly from the first base hinge assembly of the cover plate assembly; and d) attaching the seond detachable cover hinge assembly to the second base hinge assembly of the cover plate assembly.

41. A cover plate assembly comprising:

a base having a first side and a second side substantially nonparallel to the first base side, the base including at least one detachable hinge member on the first base side, and at least one detachable hinge member on the second base side;

a cover having first and second sides corresponding respectively to the first and second base sides, the second cover side being substantially nonparallel to the first cover side, the cover including at least one detachable hinge member on the first cover side that mates to the at least one hinge member on the first base side and at least one detachable hinge member on a second cover side that mates to the at least one hinge member on the second base side.

42. An electrical cover plate assembly according to claim 41, wherein the first and second base sides are substantially orthogonal with respect to one another, and the first and second cover sides are substantially orthogonal with respect to one another.

43. An electrical cover plate assembly according to claim 41, wherein the cover includes at least one removable cover tab such that removal of the at least one removable cover tab creates a corresponding at least one aperture through the cover.

* * * * *

(12) EX PARTE REEXAMINATION CERTIFICATE (9414th)
United States Patent
Shotey et al.

(10) Number: US 5,763,831 C2
(45) Certificate Issued: Nov. 16, 2012

(54) UNIVERSAL COVER PLATE, COVER PLATE ASSEMBLY, AND RELATED METHOD

(75) Inventors: Michael Shotey, Scottsdale, AZ (US); Edgar W. Maltby, Mesa, AZ (US); Mike McConnaughy, Glendale, AZ (US)

(73) Assignee: Hubbell Incorporated, Shelton, CT (US)

Reexamination Request:
No. 90/008,823, Aug. 27, 2007

Reexamination Certificate for:
Patent No.: 5,763,831
Issued: Jun. 9, 1998
Appl. No.: 08/450,559
Filed: May 25, 1995

Reexamination Certificate C1 5,763,831 issued Mar. 1, 2005

Certificate of Correction issued Apr. 10, 2001.

(51) Int. Cl.
*H02G 3/14* (2006.01)
(52) U.S. Cl. .......................................... 174/67; 220/242

(58) Field of Classification Search ...................... 174/67
See application file for complete search history.

(56) References Cited

To view the complete listing of prior art documents cited during the proceeding for Reexamination Control Number 90/008,823, please refer to the USPTO's public Patent Application Information Retrieval (PAIR) system under the Display References tab.

*Primary Examiner* — Albert J Gagliardi

(57) ABSTRACT

A method and apparatus for converting a universal cover plate for an electrical outlet to any desired specific cover plate. The apparatus includes a base having removable tabs and hinges. To create the desired cover plate, the appropriate tabs are removed to leave apertures that accommodate the desired standard electrical outlet such as a light switch or socket. An optional cover may have removable hinges that allow the cover to open along more than one axis. To make a base that fits with a lid hinged on its longer side, hinges on the shorter side are removed, by prying, sawing, or cutting. Alternatively, to make a base that fits a lid hinged on the shorter side of the base, hinges on the longer side are removed. If a base with no cover is desired, all the hinges may be removed.

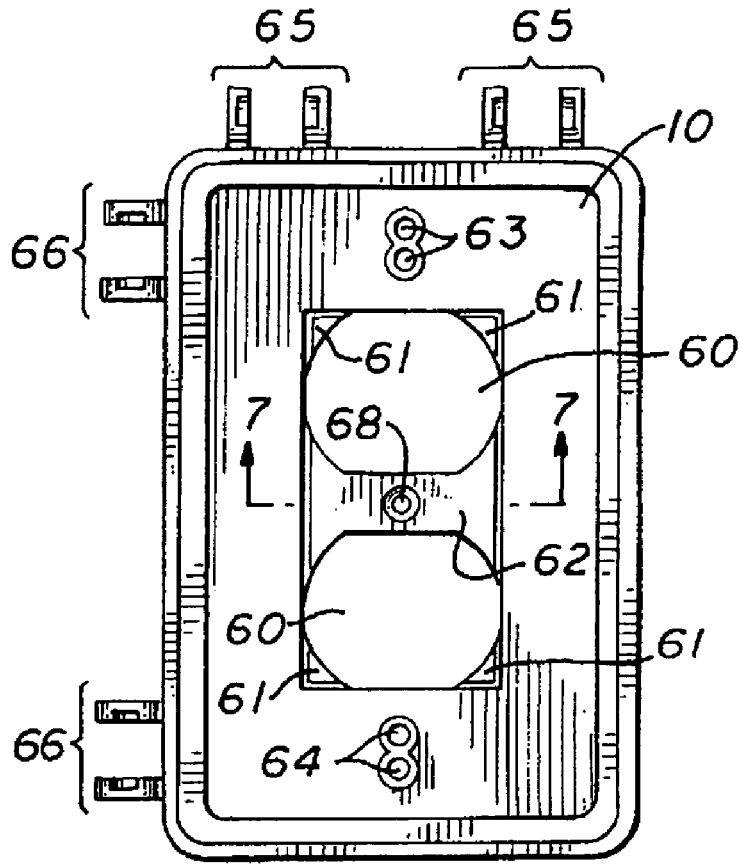

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 2 and 3 were previously cancelled.
Claims 14-18 and 24-43 are cancelled.
Claims 1, 4-13 and 19-23 were not reexamined.

\* \* \* \* \*